United States Patent [19]

Wilson

[11] 4,238,376
[45] Dec. 9, 1980

[54] COMPOSITIONS OF ETHYLENE-PROPYLENE-DIENE IONIC POLYMERS AND POLY(ALPHA-METHYLSTYRENE)

[75] Inventor: Alfred P. Wilson, St. Charles, Ill.

[73] Assignee: Standard Oil Company (Indiana), Chicago, Ill.

[21] Appl. No.: 968,262

[22] Filed: Dec. 11, 1978

[51] Int. Cl.³ .................. C08F 236/02; C08F 236/10; C08F 236/14
[52] U.S. Cl. ........................... 260/23.7 M; 260/23 S; 260/DIG. 31; 525/1; 525/191; 525/192
[58] Field of Search ................. 260/23.7 M, DIG. 31, 260/23 S; 526/1, 21; 525/1, 191, 192

[56] References Cited

U.S. PATENT DOCUMENTS

| | | | |
|---|---|---|---|
| 3,280,082 | 10/1966 | Natta et al. ............................. | 526/20 |
| 3,454,676 | 7/1969 | Busse ..................................... | 260/897 |
| 3,642,728 | 2/1972 | Canter ..................................... | 526/17 |
| 3,847,854 | 11/1974 | Canter et al. .......................... | 526/17 |
| 3,870,841 | 3/1975 | Makowski et al. ............ | 260/23.7 M |
| 4,014,831 | 3/1977 | Bock et al. ....................... | 260/23.7 R |
| 4,014,847 | 3/1977 | Lundberg et al. .............. | 260/31.8 R |

FOREIGN PATENT DOCUMENTS 1386600 12/1964 France .
1030289 5/1966 United Kingdom .

*Primary Examiner*—Ronald W. Griffin
*Attorney, Agent, or Firm*—William C. Clarke; William T. McClain; William H. Magidson

[57] ABSTRACT

Ethylene-propylene-diene ionic polymer compositions useful in injection molding, extrusion and other plastic processing techniques for fabricated products comprising an ionic elastomeric polymer and poly(alpha-methylstyrene).

7 Claims, No Drawings

COMPOSITIONS OF ETHYLENE-PROPYLENE-DIENE IONIC POLYMERS AND POLY(ALPHA-METHYLSTYRENE)

BACKGROUND OF THE INVENTION

This invention relates to ethylene-propylene-diene ionic elastomer compositions useful for fabricating products by injection molding, extrusion and other processing techniques wherein the said ionic polymeric compositions have improved impact resistance and modulus and more specifically to ionic elastomeric polymeric compositions comprising an ionic polymer and poly(alpha-methylstyrene).

In general, ionic polymers have a covalent bonded backbone such as are produced from polymerizing ethylene, propylene, vinyl acetate, vinyl methyl methacrylate, or substituted and unsubstituted styrene. From this backbone, there are pendent carboxyl or sulfonic acid groups which have cations such as zinc, sodium, cesium, etc., substituted for some portion of these acids. These ionic interchain forces clustered between the long chain molecules of the polymer structure give ionomer resins of the several monomers used solid state properties normally associated with a cross-linked structure.

Polymeric ionic compositions useful for fabricating products by injection molding or extrusion methods or other thermal methods useful in plastics processing can range in properties from those that match flexible vinyl to vulcanized rubbers according to the monomer and formulation used. Some ionic polymers are flexible like rubber and can be processed like thermoplastics.

The properties of ionic polymers relate to the presence of ionic groups. At low temperatures, the ionic groups of ionic polymers attach to each other in clusters called ionic domains. These domains connect the molecules of the polymer in such manner that the materials have strength and flexibility. Since the connecting or cross-linking of the domains is by ionic rather than by covalent bonding between the molecules, the ionic bonding permits the polymer to be deformed and worked in the same manner as thermoplastic resins upon the application of heat.

It is generally believed that cross-linking occurs through ionic domains which are made up of the partially neutralized pendent acid groups interacting between chains. This linking is reversible by heating and cooling. Once these domains are disrupted, the polymers can be compression or injection molded. The ease of filling a mold is primarily a function of melt viscosity. The lower the melt viscosity or the higher the melt flow, the easier the molten polymer can be made to fill a mold.

Although the ionic bonding accordingly permits obvious advantages in processing of thermoplastic resins, ionic polymers typically suffer from the problem of being more difficult to process than similar polymers with covalent rather than ionic bonding.

The ionic polymers or ionomers are prepared by a variety of techniques using numerous homo, co- and terpolymers as backbones. However, while all ionomers have several obvious advantages, one characteristic problem common to all is the difficulty of modifying the physical characteristics of the monomers as compared to similar polymers having the same backbone but without the ionic cross-linking.

The use of preferential plasticizers, i.e., plasticizers which primarily relax ionic bonds, are taught in the prior art as in U.S. Pat. No. 3,847,854 for improving the processability of ionic hydrocarbon polymer compositions. However, preferential plasticizers are not disclosed as affecting the properties of the polymers at normal use temperatures since the non-volatile plasticizers remaining in the final product act essentially as inert fillers and the volatile plasticizers are evolved from the ionomer once they have performed their function.

It is a general object of this invention to provide improved compositions of polyolefin ionic polymers wherein the physical characteristics can be modified and the resulting polymers have improved processability.

It has now been unexpectedly discovered that it is possible to prepare compositions of polyolefin ionic polymers which have modified and improved physical characteristics. These compositions comprise a thermoplastic polyolefin ionic polymer and poly(alpha-methylstyrene). The resulting compositions are physical mixtures, the individual components of which are linked together by various intermolecular forces, such as Van der Waal's forces, dipole-dipole interactions, or hydrogen bonding, or by chain entanglement. Thus, these systems differ sharply from block or graft copolymers in which the bonding between various components is covalent in nature. As is generally known, in contrast with low molecular weight substances, few polymers are miscible in the absence of specific polymer-polymer interaction. Phase separation is a general consequence of incompatibility. Improved performance characteristics such as improved mechanical dynamic tests without phase separation indicate compatibility of components.

The compositions of this invention differ from plasticized polyolefin polymers in that plasticization provides improved processability of the polymer at lower temperatures whereas the compositions of this invention can improve performance characteristics without necessarily improving the processability of the resulting product such as reducing processing temperatures or workability.

SUMMARY OF THE INVENTION

Ionic polymer compositions comprising an ethylene-propylene-diene ionic elastomeric polymer and from about 5 to 200 parts per hundred weight of resin (PHR) of poly(alpha-methylstyrene).

DETAILED DESCRIPTION OF THE INVENTION

The composition of this invention is a polyolefin ionic polymer composition useful in injection molding, extrusion and other plastic processing techniques comprising an ionic ethylene-polypropylene-diene terpolymer and poly(alpha-methylstyrene) wherein the resulting polyolefin ionic polymer composition has improved mechanical dynamic properties.

The improved mechanical dynamic properties of the ethylene-propylene-diene terpolymer (EPDM) and poly(alpha-methylstyrene) compositions are due primarily to the use of particular ratios of poly(alpha-methylstyrene) to the ionic elastomeric polymer which are employed therein and the process conditions employed to obtain the composition.

The polyolefin ionic polymer compositions of this invention comprise (1) an ethylene-propylene-diene terpolymer (EPDM), (2) poly(alpha-methylstyrene), and (3), optionally, reinforcing fillers, plasticizers and other additives. The rather complex system represents a unique balance of components which yields EPDM ionic polymer compositions with properties giving increased performance characteristics. The resulting compositions are useful to prepare articles that require increased tensile strength with improved modulus such as golf ball covers, shoe soles and other applications in mechanical goods which require impact properties in the final resin. The resulting compositions can be compounded with such materials as plasticizers, extenders, fillers, supplementary polymers and stabilizers to provide compounded products having a desired set of physical properties for an intended end use.

The term "ionomer" as used in the specification and claims means those polymers which are cross-linked by ionic bonding. Elastomers which fit into this definition of ionomers are described in U.S. Pat. No. 3,642,728, incorporated herein by reference, those ionomers being sulfonic acid ionomers. The ionomers are elastomers and the ionic groups of the ionomers are substantially neutralized. As used in the specification and claims, the term "substantially neutralized" means that at least 95% of the acid groups of the ionomer are neutralized by conversion to a salt. The salts can be prepared from the metals in Groups IA, IIA, IB and IIB of the Periodic Table of the Elements. The pertinent Periodic Table of the elements can be found on the inside of the back cover of Handbook of Chemistry and Physics, 46th edition, Robert C. Weast, editor, Chemical Rubber Company, Cleveland, Ohio (1965). Other metals are those of lead, tin and antimony. Other neutralizing agents such as ammonium derivatives of carboxylic acids of one to 30 carbon atoms can be used. Preferred salts are those of zinc, sodium, potassium and barium. A preferred ionomer is an EPDM gum rubber which has been sulfonated with sulfonic acid and neutralized to form a zinc salt. Other ionomers useful in the instant invention are carboxylate and phosphonate ionomers which are disclosed in U.S. Pat. No. 4,014,847, incorporated herein by reference. Methods of preparing ionomer compounds useful in the instant invention are disclosed in U.S. Pat. No. 4,014,831, incorporated herein by reference. Preferential plasticization of ionometric compounds is disclosed in U.S. Pat. No. 3,847,854.

The term "EPDM ionic polymer" is used in the sense of its definition as found in ASTM-D 1418-64 and is intended to mean a terpolymer containing ethylene and propylene in the backbone and a diene with the residual unsaturated portion in the side chain. Illustrative methods of producing these terpolymers are found in U.S. Pat. No. 3,280,082, and French Pat. No. 1,386,600 which are incorporated herein by reference. The preferred polymers contain about 45 to about 90 wt. percent ethylene and about 2 to about 10 wt. percent of a diene monomer, the balance of the polymer being propylene, at least 5 wt. percent being propylene. Preferably, the polymer contains about 50 to about 75 wt. percent ethylene, i.e., 56 wt. percent, and about 2.6 to about 4.0 wt. percent diene, i.e., 3.3 wt. percent. The diene monomer is preferably a nonconjugated diene. Illustrative of the nonconjugated diene monomers that may be used in the terpolymer (EPDM) are hexadiene, dicyclopentadiene, ethylidene norborene, methylene norborene and methyl tetrahydroindene.

A typical EPDM ionic polymer is Thionic Polymer 303 and 304 (Exxon Research and Engineering Company), a polymer having a content of about two parts ethylene by weight to about one part propylene by weight and which has been sulfonated and neutralized with a zinc salt.

While pure homopoly(alpha-methylstyrene) can be used, it is preferred to use the polymer formed from the polymerization of dehydrogenated cumene. The preferred poly(alpha-methylstyrene) used in the instant invention has an average molecular weight within the range of from about 600 to 1,000, with a molecular size distribution of from approximately 50 to 10,000, determined by Mechrolab method. Softening point by ring-and-ball method (ASTM D-36) is within the range of from about 99° C. to 141° C. Typical commercial poly(alpha-methylstyrene) polymers are Amoco Resin 18–210, Amoco Resin 18–240 and Amoco Resin 18–290 of which selected samples have the following properties as shown in Table I:

TABLE I

| Property | Method | Amoco Resin 18–210 | Amoco Resin 18–240 | Amoco Resin 18–290 |
| --- | --- | --- | --- | --- |
| Softening Point °C. | ASTM D36 | 99 | 118 | 141 |
| Viscosity, mm$^2$/S (Gardner-Holdt) 60% in Toluene | ASTM D154 | 250–300 (J-L) | 630–880 (U-V) | 2,300–2,700 (Z-Z$_1$) |
| Specific Gravity | ASTM D1298 | 1.075 | 1.075 | 1.075 |
| Molecular Weight | Mechrolab | 685 | 790 | 960 |
| Glass Transition Temp., °C. | | 45 | 49 | 49 |
| Flash Point, °C. | | 210 | 224 | 246 |

Polybutenes can be used in the composition of this invention as processing aids which act to modify the composition, allowing easier processability and improved flow rate with reduced costs. Typical polybutenes which can be used in the composition of the instant invention are low molecular weight polymers of butene and which have average molecular weights of from about 300 to 2,300. Preferred polybutenes have an average molecular weight of within the range of about 400 to about 1,300, and are a series of butylene polymers comprising predominantly (85–98%) mono-olefins with the balance being isoparaffins. Further properties of preferred polybutenes are given in Table II.

TABLE II

| | Test Method | L-50 | L-100 | H-100 | H-300 |
| --- | --- | --- | --- | --- | --- |
| Viscosity | D-445 | | | | |
| CS at 100° F. | | 106–112 | 210–227 | — | — |
| CS at 210° F. | | — | — | 196–233 | 627–675 |
| Flash Point COC °C., Min. | D-92 | 300 | 300 | 380 | 400 |
| API Gravity at 60° F. | D-287 | 33–36 | 32–35 | 26–29 | 25–28 |
| Color Haze Free, Max. | APHA | 70 | 70 | 70 | 70 |

TABLE II-continued

|  | Test Method | L-50 | L-100 | H-100 | H-300 |
|---|---|---|---|---|---|
| Haze, Max. |  | 15 | 15 | 15 | 15 |
| Appearance | Visual | No Foreign Material | No Foreign Material | No Foreign Material | No Foreign Material |
| Odor |  | Pass | Pass | Pass | Pass |
| Av. Mol Weight | Mechrolab Osmometer | 420 | 460 | 920 | 1290 |
| Viscosity Index | ASTM D567 | 90 | 95 | 109 | 117 |
| Fire Point COC, °F. | ASTM D92 | 325 | 330 | 450 | 525 |
| Pour Point, °F. | ASTM D97 | −40 | −30 | +20 | +35 |
| Sp. Grav. 60/60° F. | — | 0.8509 | 0.8571 | 0.8899 | 0.8984 |
| Density, lb/gal | — | 7.08 | 7.14 | 7.41 | 7.48 |
| Ref. Index, $N_{20}D$ | ASTM D1218 | 1.4758 | 1.4780 | 1.4941 | 1.4970 |
| Acidity, Mg KOH/gm | ASTM D974 | 0.02 | 0.02 | 0.01 | 0.01 |
| Total sulfur, ppm | X-Ray | 12 | 11 | 5 | 5 |
| Appearance |  | Bright and clear; free from suspended matter | | | |
| Evaporation Loss 10 hrs. at 210° F. (wt%) | ASTM D972 | 6.1 | 5.6 | 1.45 | 1 |

The poly(alpha-methylstyrene) can range from about 5 to about 200 parts by weight per 100 parts of the ionic polymer. Preferred range is from about 15 to about 60 parts by weight per 100 parts of the EPDM ionic polymer wherein the weight ratio of poly(alpha-methylstyrene) polymer to ionic polymer is about 1:7 to 3:5. The ratio of polybutene to EPDM can range from about 1:19 to 3:2 or from about 5 PHR to 150 PHR. Preferred range of polybutene is from about 50 to 100 PHR.

Typically, the ionic elastomer composition also comprises quantities of additives as antioxidants and other compounding ingredients such as fillers, pigments and plasticizers.

Additionally it is believed that coumarone-indene resins and other similar hydrocarbon resins are suitable for use in the invented composition although poly(alpha-methylstyrene) resins are preferred.

While any EPDM ionic elastomeric polymer can be used, the preferred EPDM ionic elastomeric polymers are approximately two parts ethylene and approximately one part propylene; the said ionic elastomeric polymer containing between about 1 to 5 wt. percent sulfur and about 0.1 to 3 wt. percent zinc. A more preferred ionic elastomeric polymer will have an analysis of approximately 2 wt. percent zinc and approximately 1 wt. percent sulfur. Stearic acid and magnesium hydroxide or magnesium oxide are typically used as compounding agents for EDPM polymers.

The following table indicates a typical base formula used:

|  | Parts by Weight |
|---|---|
| EPDM Polymer (Thionic Polymer 303) | 100 |
| Stearic acid | 10 |
| Magnesium Hydroxide | 0.6 |
| Antioxidant (Irganox 1010; Ciba-Geigy) | 1.0 |
| Poly(alpha-methylstyrene) (Amoco Resin 18) | 50 |

The compounds were prepared by hand mixing the ingredients and mill mixing at 350° F. (177° C.) in a two-roll rubber mill. A scraper was used to facilitate mill mixing. The compound was milled for a period of approximately 10 minutes and then sheeted off.

The stocks so compounded were placed in a steam press and molded at 350° F. (177° C.) for a period of ten minutes at 150 p.s.i.g. to prepare dumbbell and straight specimens. Tensile properties were determined at 20 IPM (0.5 M/min) according to ASTM-D-412, "Standard for Rubber Properties in Tension" using a Scott Tester, Model L-6, manufactured by Scott Testers, Inc., of Providence, RI. Readings were made as to the amount of force in pounds per square inch (psi) to elongate each sample 100%, designated as 100% Modulus, and 300%, designated as 300% Modulus, the amount of force required to break the sample, designated as Tensile Strength, and the amount of elongation from initial size to break, designated as Ultimate Elongation. The resistance to tear was evaluated as per ASTM D-1004, "Initial Tear Resistance of Plastic Film and Sheeting" using a Scott Tester. The tear propagation was measured according to ASTM-D-1938 "Tear Propagation Resistance of Plastic Film and Thin Sheeting by a Single-Tear Method" using a Scott Tester. The C. W. Brabender Plasticarder was used to evaluate the melt viscosity of the compounds. The melt viscosity is proportional to the equilibrium torque and RPM of the rotor. The equilibrium torque was measured at 60 RPM and 190° C. jacket temperature using a No. 6 roller head. Ross Flex was determined using a Ross Flex Tester. Abrasion resistance was determined using a Taber Abraser.

In summary, the invention relates to an ionic olefinic polymer composition comprising a composition of an ethylene-propylene-diene terpolymer (EPDM) with poly(alpha-methylstyrene) wherein the said composition is of the ratio of from about 5 to about 200 parts by weight of poly(alpha-methylstyrene) to 100 parts by weight of EPDM ionic olefinic polymer. The ratio of polybutene to EPDM is from about 5 to 150 parts by weight of polybutene to 100 parts by weight of EPDM. The molecular weight of the poly(alpha-methylstyrene) is of the range of from about 600 to 1,000, the molecular weight of the polybutene is from about 400 to about 1300, and the composition of the EPDM ionic polymer is approximately two parts of ethylene by weight to one part of propylene by weight. Preferably the ionomers are sulfonic ionomers and are substantially neutralized with a zinc salt.

In order to facilitate a clear understanding of this invention, the following specific embodiments are described in detail. These embodiments and examples are presented for purposes of illustration only and are not intended to limit the scope of the invention.

EXAMPLE I

EPDM sulfonic ionic elastomer compositions containing stearic acid, magnesium hydroxide and antioxidant were hand-mixed with varying quantities of poly(alpha-methylstyrene). The mixture was masticated on a mill for 10 minutes at 360° F. (177° C.). The composition was then sheeted off. The following recipes were evaluated (in parts per weight).

TABLE III

| EPDM Ionic Elastomer Formulations | | | | |
|---|---|---|---|---|
| | Parts by Weight | | | |
| Sample | 303-1 | 303-3 | 303-6 | 303-7 |
| EPDM (Thionic Polymer 303) | 100 | 100 | 100 | 100 |
| Stearic Acid | 10 | 10 | 10 | 10 |
| Magnesium Oxide | 0.6 | 0.6 | 0.6 | 0.6 |
| Antioxidant (Irganox 1010) | 1.0 | 1.0 | 1.0 | 1.0 |
| Poly(alpha-methylstyrene) | — | — | — | — |
| Amoco Resin 18-210 | — | 50 | — | — |
| Amoco Resin 18-240 | — | — | 50 | — |
| Amoco Resin 18-290 | — | — | — | 50 |

Thionic Polymer 303 is an ethylene-propylene-diene terpolymer and is a product of Exxon Research and Engineering Company, Linden, N.J. Inganox 1010 is a high molecular weight hindered polyphenol antioxidant and is a product of Ciba-Geigy Company, Ardsley, N.Y. Amoco Resin 18 is a poly(alpha-methylstyrene) with average molecular weights ranging from about 600 to 1,000 and is a product of Amoco Chemicals Corporation, Chicago, Ill. The −210, −240 and −290 suffixes indicate grades of differing average molecular weights.

The milled samples were evaluated in a Scott Tester Model L-6 at room temperature for 100% modulus, 300% modulus, ultimate tensile strength and % elongation. The tear strength in psi was determined on a Scott Tester and Ross flex was determined on a Ross Flex Tester. Abrasion resistance was determined on Taber Abraser using a CS-17 wheel with 500 gram weight. The results are shown in Table IV.

TABLE IV

| EPDM Ionic Elastomers - Effect of Poly(alpha-methylstyrene) | | | | |
|---|---|---|---|---|
| Sample | 303-1 | 303-3 | 303-6 | 303-7 |
| Poly(alpha-methylstyrene) Average Mol. Wgt. | — | 685 | 790 | 960 |
| 100% Modulus, psi | 447 | 584 | 292 | 541 |
| 300% Modulus, psi | 1,146 | 1,023 | 659 | 931 |
| Ultimate Tensile, psi | 2,815 | 3,435 | 1,786 | 1,438 |
| % Elongation | 490 | 500 | 485 | 415 |
| C-Tear, pLi | 191 | 83 | 69 | 65 |
| Ross Flex | All Over One Million Flexes | | | |
| Brittle Temp. °C. | −72 | −54 | −54 | −53 |
| Abrasion Resistance (Wt. Loss in Grams) | | | | |
| 1,000 Cycles | 0.0005 | 0.0288 | 0.0805 | 0.0862 |
| 2,000 Cycles | 0.0021 | 0.0764 | 0.1193 | 0.1289 |

The effect of the addition of 50 PHR of poly(alpha-methylstyrene) to the EPDM ionic polymer, Sample 303-1, is shown significantly with Sample 303-3 wherein ultimate tensile strength increased approximately 32% over the control sample with an increase in 100 percent modulus and percent elongation although 300% modulus showed a decrease. Samples 303-6 and 303-7 at 50 PHR have modified properties as to the control 303-1 as shown.

EXAMPLE II

The procedure of Example I was repeated with a higher molecular weight EPDM ionic polymer, Thionic Polymer 304 in the same recipes. The results are shown in Table V.

TABLE V

| EPDM Ionic Elastomers - Effect of Poly(alpha-methylstyrene) at 50 PHR | | | | |
|---|---|---|---|---|
| Sample | 304-3 | 304-5 | 304-8 | 304-9 |
| Poly(alpha-methylstyrene) Average Mol. Wgt. | — | 685 | 790 | 960 |
| 100% Modulus, psi | 584 | 319 | 307 | 360 |
| 300% Modulus, psi | 1,023 | 743 | 650 | 592 |
| Ultimate Elongation, % | 3,434 | 1,616 | 1,853 | 1,467 |
| % Elongation | 490 | 450 | 470 | 470 |
| C-Tear, pLi | 249 | 58 | 56 | 60 |
| Ross Flex | All Over One Million Flexes | | | |
| Brittle Temp.°C. | −70 | — | −51 | −47 |
| Abrasion Resistance | | | | |
| 1,000 Cycles | 0.0006 | 0.0140 | 0.0866 | 0.0910 |
| 2,000 Cycles | 0.0083 | 0.0600 | 0.1256 | 0.1176 |

This composition of higher molecular weight EPDM ionic polymer with poly(alpha-methylstyrene) resulted in a modification of physical properties.

EXAMPLE III

The procedure of Example I was repeated with 25 PHR of poly(alpha-methylstyrene) and 100 PHR of EPDM ionic polymer, Thionic Polymer 303. The results are in Table VI.

TABLE VI

| EPDM Elastomers - Effect of Poly(alpha-methylstyrene) at 25 PHR | | | | |
|---|---|---|---|---|
| Sample | 303-1 | 303-2 | 303-4 | 303-5 |
| Poly(alpha-methylstyrene) Average Mol. Wgt. | — | 685 | 790 | 960 |
| 100% Modulus, psi | 447 | 405 | 438 | 556 |
| 300% Modulus, psi | 1,146 | 877 | 1,090 | 1,235 |
| Ultimate Tensile, % | 2,815 | 3,949 | 3,559 | 2,886 |
| % Elongation | 490 | 550 | 515 | 438 |
| C-Tear | 191 | 300 | — | — |

The EPDM ionic polymer, Thionic Polymer 303, with poly(alpha-methylstyrene) at 25 PHR had increased ultimate tensile strength and positive increases in many other properties.

EXAMPLE IV

The procedure of Example I was repeated with higher molecular weight EPDM ionic polymer, Thionic Polymer 304, and poly(alpha-methylstyrene) at 25 PHR. The results are shown in Table VII.

TABLE VII

| EPDM Elastomers - Effect of Poly(alpha-methylstyrene) at 25 PHR | | | | |
|---|---|---|---|---|
| Sample | 304-3 | 304-4 | 304-6 | 304-7 |
| Poly(alpha-methylstyrene) Average Mol. Wgt. | — | 685 | 790 | 960 |
| 100% Modulus, psi | 584 | 534 | 427 | 458 |
| 300% Modulus, psi | 1,023 | 939 | 825 | 861 |
| Ultimate Tensile, % | 3,434 | 2,285 | 3,726 | 2,646 |
| % Elongation | 490 | 495 | 525 | 500 |

The addition of poly(alpha-methylstyrene) at 25 PHR to higher molecular weight EPDM resulted in a lowering of the physical properties with the exception of Sample 304-6.

EXAMPLE V

The procedure of Example I was repeated with typical extrusion formulations containing poly(alpha-methylstyrene) and/or polybutene. Typical recipes and test results are shown in Table VIII. These formulations are suitable for extruded articles and profiles.

TABLE VIII

EPDM Ionic Elastomers - Effect of Poly(alpha-methylstyrene) and Polybutene

| Sample | 101I | 101J | 101K | 101L | 101M |
|---|---|---|---|---|---|
| PDM (Thionic Polymer 303) | 100 | 100 | 100 | 100 | 100 |
| Zinc Stearate | 10 | 10 | 10 | 10 | 10 |
| Ca Carbonate (90T) | 200 | 200 | 200 | 100 | 0 |
| Irganox 1010 | 0.5 | 0.5 | 0.5 | 0.5 | 0.5 |
| Poly(alpha-methylstyrene) | 25 | 50 | 50 | 25 | 25 |
| H-100 Polybutene | — | — | 50 | — | 50 |
| Mg Hydroxide | 1 | 1 | 1 | 1 | 1 |
| Tensile Strength, psi | 1,350 | 1,275 | 880 | 1,810 | 685 |
| 100% Modulus, psi | 1,315 | 1,275 | 630 | 1,135 | 260 |
| 300% Modulus, psi | — | — | 865 | 1,510 | 645 |
| Elongation, % | 210 | 205 | 325 | 390 | 310 |
| Abrasion-Taber CS 17 Wheel, loss in grams | 500 gm. wt.-weight | | | | |
| 1000 cycles | .041 | .046 | .009 | .002 | .001 |
| 2000 cycles | .074 | .094 | .023 | .012 | .006 |
| Tear Resistance Die C #/in. (N/M) | 173 | 184 | 128 | 165 | 170 |
| Propagation #/in (N/M) | 43 | 30 | 28 | 24 | 16 |
| Shore A instant/15 sec. | 88/85 | 88/85 | 75/70 | 86/82 | 62/58 |
| Equilibrium Torque Mgms | 3,350 | 2,750 | 1,950 | 3,150 | 1,800 |

Calcium carbonate (90T) is a product of Pleuss-Staufer, Inc., New York, N.Y. The zinc stearate is a product of Synthetic Products, Div. of Dart Industries, Cleveland, Ohio.

The above test results indicate that formulations containing poly(alpha-methylstyrene) homopolymers and/or polybutene are suitable for extruded articles and profiles such as cable sheathing and wire coating as well as injection molding. The physical characteristics can be modified according to application requirements.

EXAMPLE VI

The procedure of Example I was repeated with standard recipes of EPDM ionic elastomers and standard recipes of EPDM ionic elastomers with poly(alpha-methylstyrene) and polybutene in different ratios and different compounding ingredients. The recipes and test results are in Table IX. The results of Table IX are consistent with the results of Table VIII. Imsil A 108 is a product of Illinois Minerals Co., Cairo, Ill. LD 600 is a product of Exxon Co., Houston, Tex. Opal Block is a product of Microchemical Industries, Memphis, Tenn.

TABLE IX

EPDM Ionic Elastomers - Effect of Poly(alpha-methylenestyrene) and Polybutene

| Sample | 101E | 101F | 101G | 101H |
|---|---|---|---|---|
| EPDM (Thionic Polymer 303) | 100 | 100 | 100 | 100 |
| Zn Stearate | 10 | 10 | 10 | 10 |
| Imsil A 108 | 150 | 100 | 200 | 50 |
| LD 600 | 25 | 25 | — | 25 |
| Irganox 1010 | 0.35 | 0.35 | 0.35 | 0.35 |
| Poly(alpha-methylstyrene) | 25 | 25 | 50 | 25 |
| L-100 Polybutene | 85 | 85 | — | 85 |
| H-100 Polybutene | — | — | 100 | — |
| Mg Hydroxide | 6 | 6 | 3 | 3 |
| Opal Black | — | 50 | — | 100 |
| Tensile Strength, psi | 695 | 850 | 940 | 675 |
| 100% Modulus, psi | 390 | 315 | 325 | 605 |
| 300% Modulus, psi | 595 | 640 | 630 | — |
| Elongation, % | 385 | 565 | 505 | 140 |
| Abrasion-Taber, CS 17 wheel, loss in gms | 500 gm. weight-weight | | | |
| 1000 cycles | .007 | .002 | .019 | .051 |
| 2000 cycles | .118 | .020 | .103 | .076 |
| Tear Resistance Initial Die C#/in. (N/M) | 128 $(224 \times 10^2)$ | 116 $(203 \times 10^2)$ | 133 $(233 \times 10^2)$ | 131 $(229 \times 10^2)$ |
| Propagation #/in. (N/M) | 33 $(58 \times 10^2)$ | 29 $(51 \times 10^2)$ | 42 $74 \times 10^2)$ | 62 $(109 \times 10^2)$ |
| Shore A Instant/15 sec. | 69/64 | 68/64 | 62/58 | 78/70 |
| Equilibrium Torque, Mgms. | 2,500 | 3,500 | 3,250 | 3,700 |

What is claimed is:

1. A composition comprising an ethylene-propylenediene ionic terpolymer comprising from 5 to 200 parts per hundred by weight of resin of poly(alpha-methylstyrene) per 100 parts by weight of terpolymer wherein the ionic group in said terpolymer comprises one member selected from the group consisting of sulfonic groups, carboxylate groups and phosphonate groups and at least some of said ionic groups are neturalized with a neturalizing agent and wherein the molecular weight of said poly(alpha-methylstyrene) is within the range of from about 600 to about 1000.

2. The composition of claim 1 wherein the said ionic group is a sulfonic group.

3. The composition of claim 2 wherein the ionic groups are substantially neutralized by conversion to a salt, the said salts being prepared from at least one of the metals in Group IA, IIA, IB and IIB of the Periodic Table, and lead, tin and antimony, and ammonium derivatives of carboxylic acids of one to 30 carbon atoms.

4. The composition of claim 3 wherein the ionic groups are converted to a zinc salt.

5. The composition of claim 1 wherein the said ionic olefinic polymer has a zinc content of about 0.1 to 3 weight percent and a sulfur content of about 1 to 5 weight percent.

6. The composition of claim 1 wherein the poly-(alpha-methylstyrene) is present within the range of from 50 to 100 parts per hundred by weight of resin.

7. The composition of claim 1 wherein butylene polymers are present within the range of from about 50 to 150 parts per hundred by weight of resin, the said butylene polymers having a molecular weight range of from about 400 to 1300.

* * * * *

UNITED STATES PATENT OFFICE
CERTIFICATE OF CORRECTION

Patent No. 4,238,376      Dated December 9, 1980

Inventor(s) Alfred P. Wilson

It is certified that error appears in the above-identified patent and that said Letters Patent are hereby corrected as shown below:

| Patent Column | Line | |
|---|---|---|
| 1 | 64 | "homo," should be --homo-,-- |
| 7 | 12 | "Tonic" (Heading of table) should be --Ionic-- |
| 7 | 27 | "Inganox" should be --Irganox-- |
| 9 | 53-54 | "500 gm. wt.-weight" (Last half placed in wrong column) should be --500 gm. wt.-weight loss in grams-- |
| 10 | 21 | "Poly(alpha-methylenestyrene)" should be --Poly(alpha-methylstyrene-- |
| 10 | 17 | "Opal Block" should be --Opal Black-- |

UNITED STATES PATENT OFFICE
CERTIFICATE OF CORRECTION

Patent No. 4,238,376     Dated December 9, 1980

Inventor(s) Alfred P. Wilson

It is certified that error appears in the above-identified patent and that said Letters Patent are hereby corrected as shown below:

| Patent Column | Line | |
|---|---|---|
| 10 | 46 | "74 x $10^2$)" (In Table) should be --(74 x $10^2$)-- |

Signed and Sealed this

Fourteenth Day of April 1981

[SEAL]

Attest:

RENE D. TEGTMEYER

Attesting Officer     Acting Commissioner of Patents and Trademarks

William C. Clarke